United States Patent Office
3,796,794
Patented Mar. 12, 1974

3,796,794
USE OF CARBOXYLIC ACIDS AS CRYSTAL GROWTH MODIFIERS FOR SODIUM CARBONATE MONOHYDRATE
Joseph M. Ilardi, Randall Park, N.J., assignor to International Research and Development, Green River, Wyo.
No Drawing. Filed June 1, 1972, Ser. No. 258,657
Int. Cl. C01d 7/36, 7/40
U.S. Cl. 423—421                                7 Claims

ABSTRACT OF THE DISCLOSURE

Sodium carbonate monohydrate of acicular crystalline form is obtained by crystallizing sodium carbonate monohydrate in aqueous solution containing as a crystal modifying agent an aliphatic carboxylic acid having from 4 to about 18 carbon atoms and from 1–3 carboxylic acid functions. On calcination of the sodium carbonate monohydrate it yields soda ash having a lower bulk density than that produced from unmodified sodium carbonate monohydrate.

---

This invention relates to the production of sodium carbonate monohydrate from aqueous sodium carbonate. In particular, it pertains to modifying the crystalline characteristics of sodium carbonate monohydrate in order to obtain soda ash of altered bulk properties.

Anhydrous sodium carbonate, or soda ash as it is normally referred to, is an important commodity used in large quantities by the chemical industry. Although obtainable by several processes, soda ash is produced today to a large degree from trona ore which is principally sodium sesquicarbonate ($Na_2CO_3 \cdot NaHCO_3 \cdot 2H_2O$). Large underground deposits of this ore are found in certain sections of Wyoming, Utah and Colorado as well as various other areas throughout the world.

Generally speaking there are two commonly practiced procedures for producing soda ash from trona. In one of the processes, the trona is crystallized to form purified sodium sesquicarbonate dihydrate which is calcined to give soda ash. In the other process, the ore is calcined to convert it to crude anhydrous sodium carbonate which is then crystallized from an aqueous solution and dried to give soda ash. Whereas soda ash produced from sodium sesquicarbonate is acicular in form, soda ash produced from sodium carbonate monohydrate consists of blocky type crystals. It is to be understood herein that when referring to soda ash crystals, they are pseudomorphs after the hydrated sodium carbonate precursors.

However, there are difficulties in converting from the sesquicarbonate to the monohydrate process of making soda ash. The sesquicarbonate plants are designed for handling the acicular sesquicarbonate crystals which have bulk properties different from the blocky monohydrate crystals. In the sesquicarbonate plant the evaporators, slurry tanks, conveyor carts and the equipment generally are designed for handling the elongated sesquicarbonate crystals. Such equipment will not accommodate a direct replacement of the sesquicarbonate with the monohydrate process without extensive and prohibitively expensive plant modification. An alternative is to modify the crystalline growth characteristics of the monohydrate crystals whereby they resemble or approach the crystal shape and bulk density of the sesquicarbonate crystals.

Various methods have been reported directed to techniques for alternating the crystalline habit of sodium carbonate.

Thus, in U.S. Pat. 3,248,182 to Herink et al. the bulk density, size and shape of sodium sesquicarbonate crystals produced from a saturated aqueous solution is improved by having present in the solution about 5 to about 400 p.p.m. of a mixture of an anionic organic surfactant capable of absorbing on sesqui crystals and a hydrocarbon oil having a boiling point of 80° C.–400° C.; U.S. Pat. 2,954,282 to Bauer et al. advocates the use of an anionic surfactant alone to improve the crystalline pattern of sodium sesquicarbonate dihydrate.

Prior processes directed to altering the crystallinity of sodium carbonate monohydrate are described in U.S. Pat. 3,486,844 to Tabler where sodium carbonate monohydrate crystals having a compact granular form are grown from an aqueous solution of sodium carbonate using a combination of a water-soluble carbohydrate gum, a soluble sulfate and a soluble silicate. The process is said to produce a blocky form of crystal; U.S. Pat. 2,670,269 to Rahn describes an improved dense soda ash of compact granular form and improved dusting characteristics obtained by conducting the crystallization in the presence of various organo sulfates or organo sulfonates; British Pat. 1,208,414 states that sodium sulfate is effective in producing a columnar type of sodium carbonate monohydrate crystal.

It has now been discovered that the crystal shape and pattern of soda ash produced from sodium carbonate monohydrate can be altered to produce an acicular type of crystal by forming sodium carbonate monohydrate in the presence of an aliphatic carboxylic acid of 4–18 carbon atoms and 1–3 carboxylic acid groups. The provisions of such a process and acicular sodium carbonate produced thereby constitutes the principal object and purpose of the invention. Other objects and purposes will become manifest subsequently.

According to the present invention, sodium carbonate monohydrate crystals of substantially acicular form are produced from an aqueous saturated solution of sodium carbonate containing small amounts of a soluble aliphatic carboxylic acid. The concentration of the carboxylic acid is in the range of from about 10 p.p.m. to about 500 p.p.m. based on the weight of the saturated sodium carbonate solution. So far as can be determined, any soluble aliphatic carboxylic acid having from 4–18 carbon atoms and from 1–3 carboxylic acid groups can be used. Exemplary carboxylic acids include oxalic acid, tartaric acids, citric acid, itaconic acid, maleic acid, fumaric acid, succinic acid, pimelic acid, adipic acid, acetic acid, propionic acid, 1-butanoic acid, 1-pentanoic acid, 1-hexanoic acid, 1-heptanoic acid, 2-ethyl hexanoic acid, 1-octanoic acid, 2-ethyl-1-decanoic acid, 1-tetradecanoic acid, 1-pentadecanoic acid, 1-octadecanoic acid and the like.

As yet it has not been ascertained how the soluble carboxylic acids affect the crystalline habitat of the sodium carbonate monohydrate. By way of a theoretical explanation it is felt that the presence of the carboxylic acid influences crystal growth by attraction to the crystal c-face. X-ray analysis of sodium carbonate monohydrate crystals indicate that the soluble carboxylic acid ion could be attracted via hydrogen bonding to the crystal c-face where the water of crystallization molecules are located with concomitant modification in crystal growth.

The aliphatic carboxylic acid crystal modifiers herein can be blended or incorporated with the sodium carbonate either in a batch or a continuous operation. In batch crystallization, pure sodium carbonate is dissolved in distilled water and the solution filtered to remove insolubles. A solution having a density of 1.316 g./cc. at 40° C. is used. At the start of the run one liter of this solution is placed in a two liter baffled round bottom flask and the organic acid modifier added, the concentration of the additive being based on solution weight. While stirring, the solution is brought to boiling (104° C.) and 500 cc. of water evaporated over a five-hour period. The contents of the flask are centrifuged and a COD (chemical oxygen demand) analysis is performed on the crystals and mother liquors. The crystals are observed microscopically for habit, bulk density and particle size distribution are measured.

In the continuous process of producing sodium carbonate monohydrate, the sodium carbonate solution to be used in warmed to 50° C. and the crystallizer filled with 4100 ml. of this solution and then water slowly evaporated therefrom at 104° C. until the concentration of sodium carbonate reaches saturation or about 31%. At this time seed crystals are added and the slurry density adjusted by further evaporation to run level. After the desired slurry is attained an evaporation rate of 15 ml. per minute is held at 104° C. and a constant ratio of slurry to water is withdrawn; 100 ml. $H_2O$/113 ml. slurry. These conditions are held for an entire run. Every two hours a slurry sample is withdrawn and centrifuged, the crystals observed for their sizing and bulk density. Growth modifiers are introduced into the slurry after several days of operation so that the additive level effect is given time to stabilize. Such an arrangement permits the incremental increase in crystal growth modifier to determine their effect on product characteristics.

In the processes aforesaid for preparing the sodium carbonate monohydrate crystals of the invention, the slurries were formed at 104° C. However, as those skilled in the art are aware, the slurries can be produced at other temperatures within the range of 35.4° C. to 109.0° C.

Reference is now made to the following non-limiting examples.

BATCH SYSTEM

Example 1

One liter of C.P. $Na_2CO_3$ solution weighing 1316 g. was placed into a 2 l. Morton flask. The flask was thermostated at 104° C. to cause the solution to boil. Five hundred cc. of $H_2O$ was evaporated over a 5-hour period at the end of which time the slurry was filtered. The $$Na_2CO_3 \cdot H_2O$$

crystals were now observed microscopically for habits, bulk density and a particle size distribution were taken. The resulting product was a well formed, blocky monohydrate crystal with the axis $a \cong b \cong c$. The bulk density was 68 lbs./ft.³ and the sizing being 5%+40, 70%+100, and 97%+200.

Example 2

The procedure of Example 1 was repeated except that prior to boiling, 26.3 mg. of decanoic acid was placed into the flask (200 p.p.m.). The resulting crystals were acicular sesquilike ($b$ greater than $a$, $c$) having a product bulk density of 57 lbs./ft. cube with a sizing 5%+40, 64%+100, and 93%+200.

CONTINUOUS SYSTEM

Example 3

Thirteen liters of soda ash solution analyzing at 44 p.p.m. COD as carbon weighing 16,250 g. was placed into a 5 gallon polyethylene carboy and kept warm (~50° C.). Approximately 4100 ml. of this solution was now placed into the laboratory crystallizer and $H_2O$ evaporated until saturation, at which time 50 g. of seed crystals were added. A slurry density of ≈30% by weight was held using an evaporation rate of 15 ml./min. and a residence time of 4.3 hrs. Every 3 minutes ≈50 ml. of slurry was discharged from the crystallizer body to maintain the ratio of 100 ml. $H_2O$ evaporated to 113 ml. slurry discharged. After steady state was reached (at least 4 turnovers of about 4.3 hours each), several products were taken. The average steady state product was a well shaped ($a=b=c$) product having a high bulk density 67.5 lbs./ft.³ and good sizing: 4%+40, 28%+70, and 94%+200.

Example 4

After the product from Example 3 was categorized, addition of 259 mg. citric acid was made into the original 13 l. of solution to adjust the citric acid level to 16 p.p.m. Ample time was allowed for the system to equilibrate (4 turnovers), after which more products were taken. The $Na_2CO_3 \cdot H_2O$ crystals now grew flakier (), the sizing is decreased to 5%+40, 20%+70, and 90%+200 and the bulk density was reduced to 66.4 lbs./ft.³.

EXAMPLE 5

Further additions of citric acid were made to adjust level to 215 p.p.m. After steady state was reached, new products were taken. The crystals were now more flat, the bulk density had decreased further to 62.0 lbs./ft.³, and the sizing greatly reduced to 0%+40, 7%+70, and 78%+200.

Table I shows that a variety of carboxylic acids are effective as growth modifiers for sodium carbonate monohydrate using the batch crystallization procedure. Table II shows the effect of a given aliphatic carboxylic acid i.e. citric acid at various concentrations on the physical or bulk properties of sodium carbonate monohydrate. Table III shows the effect of varying of the concentration of another aliphatic carboxylic acid i.e. decanoic acid on the crystalline characteristics and bulk properties of sodium carbonate monohydrate. The continuous crystalline process was used in obtaining the data for both Table II and III.

TABLE I

[Batch study—$Na_2CO_3 \cdot H_2O$ growth modifiers [a]]

| Additive | P.p.m. level | Bulk density (lbs./ft.³) [b] | Product +40 mesh | +100 mesh | +200 mesh | −200 mesh |
|---|---|---|---|---|---|---|
| Blank | | 67 | 5 | 70 | 97 | 3 |
| Oleic acid | 300 | 55 | 28 | 42 | 60 | 40 |
|  | 100 | 61 | 24 | 53 | 79 | 21 |
| Fumaric acid | 300 | 62 | 5 | 67 | 94 | 6 |
|  | 100 | 60 | 1 | 63 | 92 | 8 |
|  | 50 | 65 | 6 | 71 | 96 | 4 |
| Maleic acid | 600 | 63 | 0 | 65 | 97 | 3 |
|  | 300 | 64 | 2 | 60 | 92 | 8 |
|  | 100 | 65 | 4 | 60 | 94 | 6 |
| Hexanoic acid | 600 | 72 | 76 | 90 | 90 | 10 |
|  | 300 | 70 | 58 | 89 | 94 | 6 |
|  | 100 | 66 | 5 | 58 | 97 | 3 |
| Decanoic acid | 300 | 46 | 0 | 15 | 43 | 57 |
|  | 100 | 42 | 2 | 29 | 68 | 32 |
|  | 50 | 43 | 1 | 29 | 72 | 28 |
|  | 20 | 57 | 5 | 64 | 93 | 7 |
| Octadecanoic acid | 100 | 63 | 7 | 67 | 84 | 16 |
| Citric acid | 300 | 40 | 4 | 67 | 96 | 4 |
|  | 100 | 54 | 5 | 48 | 94 | 6 |
|  | 50 | 43 | 4 | 47 | 87 | 13 |
|  | 25 | 44 | 1 | 50 | 85 | 15 |
|  | 10 | 58 | 13 | 92 | 99 | 1 |

[a] All additives in table were growth modifiers of $Na_2CO_3 \cdot H_2O$.
[b] Bulk density for anhydrous ash.

TABLE II

[Continuous crystallization—citric acid additive]

| P.p.m. citric acid | Slurry density | Bulk density, (lbs./ft.³) | Particle size (percent) +40 | +70 | +200 |
|---|---|---|---|---|---|
| 0 | 29.5 | 67.5 | 0.4 | 28 | 94 |
| 16 | 28.0 | 66.4 | 0.5 | 20 | 90 |
| 49 | 30.5 | 65.0 | 1 | 12 | 86 |
| 83 | 28.1 | 64.5 | 0.1 | 9 | 84 |
| 171 | 30.3 | 63.0 | 0 | 8 | 80 |
| 215 | 31.7 | 62.0 | 0 | 7 | 78 |

TABLE III

[Continuous crystallization—decanoic acid]

| P.p.m. decanoic acid | Slurry density | Bulk density, (lbs./ft.³) | Particle size (percent) +40 | +70 | +200 |
|---|---|---|---|---|---|
| 0 | 29.5 | 67.7 | 0.7 | 27 | 92 |
| 10 | 28.9 | 60.0 | 0.3 | 21 | 88 |
| 30 | 30.0 | 54.2 | 0.1 | 19 | 86 |
| 80 | 29.7 | 40.0 | 0 | 6 | 51 |

The determination of COD as carried out herein is based on the oxidation of organic and oxidizable inorganic materials in the sample with dichromate in a 50% sulfuric acid medium. A 50% excess of dichromate is necessary to complete the oxidation. The excess dichromate is determined by titration with ferrous ammonium sulfate using ferroin as an indicator. The net dichromate consumption is calculated as carbon (or Chemical Oxygen Demand, COD).

The following substances interfere in this procedure: ferrous iron, nitrites, sulfites, sulfides, phosphites, hypophosphates, and chloride (halide). The method compensates, through the use of mercuric ion, for up to approximately 150 p.p.m. chloride (absolute positive error ~2.0 p.p.m. C.).

If higher amounts of chloride are present (>150 p.p.m.) and high accuracy is desired, the final titration volume has to be adjusted as follows.

Using the sample size (30 ml.≈40 g.) and the reagent concentrations suggested in the method, the volume of the ferrous ammonium sulfate solution used for the back titration should be increased by 0.1 ml. for every 150 p.p.m. chloride present. This correction was found valid to 1,500 p.p.m. chloride.

The preferred acid/water ratio for this determination is 1.00. Increasing the ratio to 1.06 will result in a small but significant positive error (≈2.6 p.p.m. C.). No errors were observed for ratios as low as 0.89.

The addition of silver ion, as an oxidation catalyst, extends the method to all but a few refractory organics (e.g. pyridine).

What is claimed is:

1. A process for preparing sodium carbonate monohydrate having acicular crystalline form which comprises crystallizing at a temperature between 35.4° C. to 109.0° C. sodium carbonate monohydrate from a saturated aqueous solution in the presence of about 10–500 p.p.m. of an aliphatic carboxylic acid of 4–18 carbon atoms and 1–3 carboxylic acid groups.

2. The process according to claim 1 wherein the carboxylic acid contains a single carboxylic acid group.

3. The process according to claim 1 wherein the carboxylic acid contains two carboxylic acid groups.

4. The process according to claim 1 wherein the polycarboxylic acid contains three carboxylic groups.

5. The process according to claim 2 wherein the carboxylic acid is octadecanoic acid.

6. The process according to claim 3 wherein the dicarboxylic acid is maleic acid.

7. The process according to claim 4 wherein the tricarboxylic acid is citric acid.

References Cited
UNITED STATES PATENTS

| | | | |
|---|---|---|---|
| 3,725,014 | 4/1973 | Poncha et al. | 423—421 |
| 2,372,402 | 3/1945 | Stokes | 423—421 X |
| 3,717,698 | 2/1973 | Ilardi et al. | 423—206 |

OSCAR R. VERTIZ, Primary Examiner

B. E. HEARN, Assistant Examiner

U.S. Cl. X.R.

423—266; 23—300, 302